(12) United States Patent
Ronchini Ximenes et al.

(10) Patent No.: US 12,130,387 B2
(45) Date of Patent: Oct. 29, 2024

(54) PHOTON DETECTING 3D IMAGING SENSOR DEVICE

(71) Applicant: ECOLE POLYTECHNIQUE FéDéRALE DE LAUSANNE EPFL-TTO, Lausanne (CH)

(72) Inventors: Augusto Ronchini Ximenes, Delft (NL); Preethi Padmanabhan, Neuchâtel (CH); Edoardo Charbon, The Hague (NL)

(73) Assignee: FASTREE3D SA, Ecublens Vd (CH)

( * ) Notice: Subject to any disclaimer, the term of this patent is extended or adjusted under 35 U.S.C. 154(b) by 1066 days.

(21) Appl. No.: 16/968,198

(22) PCT Filed: Feb. 9, 2018

(86) PCT No.: PCT/EP2018/053340
§ 371 (c)(1),
(2) Date: Aug. 7, 2020

(87) PCT Pub. No.: WO2019/154513
PCT Pub. Date: Aug. 15, 2019

(65) Prior Publication Data
US 2021/0072360 A1    Mar. 11, 2021

(51) Int. Cl.
*G01S 7/4863* (2020.01)
*G01S 7/4865* (2020.01)
(Continued)

(52) U.S. Cl.
CPC .......... *G01S 7/4863* (2013.01); *G01S 7/4865* (2013.01); *G01S 17/10* (2013.01); *G01S 17/894* (2020.01);
(Continued)

(58) Field of Classification Search
CPC ...... G01S 7/4863; G01S 17/10; G01S 17/894; G01S 7/4865; H04N 13/254; H04N 13/296
(Continued)

(56) References Cited

U.S. PATENT DOCUMENTS 7,547,872 B2 * 6/2009 Niclass ................... G01T 1/248
250/214 R
9,007,118 B2 * 4/2015 Dutton ..................... G06G 7/12
327/515
(Continued)

FOREIGN PATENT DOCUMENTS

WO    WO-2015028148 A1 *    3/2015    ........... G01T 1/1642

OTHER PUBLICATIONS

Machine Translation of WO 2015028148 A1 (Year: 2015).*
(Continued)

*Primary Examiner* — Yuqing Xiao
*Assistant Examiner* — Benjamin Richard Hebert
(74) *Attorney, Agent, or Firm* — Michael J. McCandlish; Mindful IP PLLC (57) ABSTRACT

A photon detecting 3D imaging sensor device for detecting a distance information for pixels in an image includes an array of detector units. Each detector unit is configured to receive a light signal pulse and to provide a detection signal pulse on receipt of the light signal pulse. The 3D imaging device further includes a pulse selection unit including a decision tree with one or more stages. Each of the stages has one or more decision makers which are cascaded to propagate the earliest detection signal pulse of one of a respective detector unit as a timing signal. The 3D imaging device further includes a time-to-digital converter configured to receive the timing signal and to provide a time stamp (Continued)

depending on the timing signal. The time stamp indicates the distance information for a pixel of the image.

9 Claims, 5 Drawing Sheets

(51) Int. Cl.
  *G01S 17/10* (2020.01)
  *G01S 17/894* (2020.01)
  *H04N 13/254* (2018.01)
  *H04N 13/296* (2018.01)

(52) U.S. Cl.
  CPC ......... *H04N 13/254* (2018.05); *H04N 13/296* (2018.05)

(58) Field of Classification Search
  USPC ...................................................... 356/5.01
  See application file for complete search history.

(56) References Cited

U.S. PATENT DOCUMENTS

| | | | |
|---|---|---|---|
| 9,952,323 B2* | 4/2018 | Deane | G01S 7/4817 |
| 10,697,829 B2* | 6/2020 | Delic | G01J 1/44 |
| 10,908,266 B2* | 2/2021 | Morcom | G01S 17/10 |
| 2006/0202129 A1 | 9/2006 | Niclass et al. | |
| 2014/0070867 A1 | 3/2014 | Dutton | |
| 2015/0041625 A1* | 2/2015 | Dutton | G01T 1/2985 341/166 |
| 2015/0172578 A1* | 6/2015 | Kirsch | H04N 25/44 348/302 |
| 2015/0285625 A1* | 10/2015 | Deane | G01S 7/4817 348/140 |

OTHER PUBLICATIONS

International Search Report and Written Opinion for PCT/EP2018/053340 mailed Oct. 19, 2018 (12 pages).

Braga L. H.C, et al., "A Fully Digital 8×16 SiPM Array for PET Applications With Per-Pixel TDCs and Real-Time Energy Output", IEEE Journal of Solid-State Circuits, vol. 49, No. 1, Jan. 2014.

Carimatto A. et al., "A 67,392-SPAD PVTB-Compensated Multi-Channel Digital SiPM with 432 Column-Parallel 48ps 17b TDCs for Endoscopic Time-of-Flight PET", Delft University of Technology, 2015 IEEE International Solid- State Circuits Conference, pp. 202-205.

Niclass C. et al., "A 128 128 Single-Photon Image Sensor With col. Level 10-Bit Time-to-Digital Converter Array", IEEE Journal of Solid-State Circuits, vol. 43, No. 12, Dec. 2008, pp. 2977ff.

Veerappan C. et al., "17.7 A 160×128 Single-Photon Image Sensor with on-Pixel 55ps 10b Time-to-Digital Converter", ISSCC 2011, Biomedical & Displays, 2011 IEEE International Solid-State Circuits Conference, pp. 312ff.

Ronchini Ximenes, Augusto et al., "Mutually Coupled Ring Oscillators for Large Array Time-of-Flight Imagers", Published 2017.

* cited by examiner

PHOTON DETECTING 3D IMAGING SENSOR DEVICE

CROSS-REFERENCE TO RELATED APPLICATIONS

This application is a national stage of, and claims priority to, Patent Cooperation Treaty Application No. PCT/EP2018/053340, filed on Feb. 9, 2020, which application is hereby incorporated herein by reference in its entirety.

TECHNICAL FIELD

The present disclosure relates to 3D imaging sensor devices, particularly to imaging sensor devices using photon detection, such as single photon avalanche diode (SPAD)-based 3D imaging sensor devices.

TECHNICAL BACKGROUND

There is an increasing need for high-performance three-dimensional (3D) imaging in various technical fields. While there are various techniques for 3D imaging, one preferred technique applies direct time-of-flight measurement for laser pulses using photon detecting elements, such as photodiodes and single-photon avalanche diodes (SPAD).

Systems using direct time-of-flight measurements include light detection and ranging systems (LIDAR), which are already used for various applications such as spacecraft navigation, assembling line robotics, augmented and virtual reality, surveillance and the like. Common requirements are accuracy and detection speed, while ensuring long operating distance, high tolerance to background illumination and robustness to interference from other LIDAR systems.

Various architectures have been proposed typically making use of resource sharing that often introduces tradeoffs between pixel count and speed.

Document Braga L. H. C, et al., "A Fully Digital 8×16 SiPM Array for PET Applications With Per-Pixel TDCs and Real-Time Energy Output", IEEE JOURNAL OF SOLID-STATE CIRCUITS, VOL. 49, NO. 1, JANUARY 2014 shows a CMOS silicon photomultipliers detector array for PET applications. It makes use of counters and Time-to-Digital-Converters. An adder tree overlaid on top of the pixel array sums the sensor total counts, which are then used for detecting the asynchronous gamma events on-chip. To select from close detection events and OR-tree is provided. Because the OR tree is level sensitive, it requires monostable circuits and it suffers from pile-up effect. Further an address of which pixel generated the event cannot be determined.

Carimatto A. et al., "A 67,392-SPAD PVTB-Compensated Multi-Channel Digital SiPM with 432 Column-Parallel 48 ps 17b TDCs for Endoscopic Time-of-Flight PET", Delft University of Technology, 2015 IEEE International Solid-State Circuits Conference, Pages 202-205 discloses an endoscopic sensor to detect photons wherein the first time-of-arrival event in every detection frame is selected from a bus connecting multiple addressable pixels. The sensor comprises MD-SiPMs, a high-voltage generator, and a bank of column-parallel time-to-digital converters.

Niclass C. et al., "A 128 128 Single-Photon Image Sensor With Column-Level 10-Bit Time-to-Digital Converter Array", IEEE JOURNAL OF SOLID-STATE CIRCUITS, VOL. 43, NO. 12, DECEMBER 2008, pages 2977ff discloses an imager for time-resolved optical sensing which comprises an array of single-photon pixels, a bank of time-to-digital-converters, and a readout system. The imager implements a photon time-of-arrival evaluation using bus lines.

Veerappan c. et al., "17.7 A 160×128 Single-Photon Image Sensor with On-Pixel 55 ps 10b Time-to-Digital Converter", ISSCC 2011, BIOMEDICAL & DISPLAYS, 2011 IEEE International Solid-State Circuits Conference, pages 312ff discloses an array of 160×128 pixels capable of detecting the time-of-arrival of single photons. The pixels in the rows are read out in rolling shutter mode in two directions simultaneously. The 10b content of each pixel is thus transferred to the exterior of the chip via independent serializers, 2 for each column, working in parallel. Therein, a single time-to-digital converter per pixel is used, without the need to sharing. An address and time-of-flight of each pixel can be obtained. The disclosed image sensor has a high power consumption and implies a high calibration effort.

It is an object of the present disclosure to provide an improved architecture for an 3D imaging sensor device using direct time-of-flight measurement with an improved characteristic, particularly an improved fill factor, high uniformity and low pile-up distortion while ensuring resource sharing.

SUMMARY

Above object has been achieved by the 3D imaging sensor device for detecting a distance information for pixels in an image as disclosed herein.

According to an example a photon detecting 3D imaging sensor device is provided for detecting a distance information for pixels in an image, comprising:
- an array of detector units each detector unit being configured to receive light signal pulses and to provide a detection signal pulse on receipt of a light signal pulse;
- a pulse selection unit including a decision tree with one or more stages, wherein each of the stages has one or more decision makers which are cascaded to propagate the earliest detection signal pulse of one of a respective detector unit as a timing signal, wherein the decision makers are configured to select one of a plurality of detection signal pulses for propagation;
- a time-to-digital converter configured to receive the timing signal and to provide a time stamp depending on the timing signal wherein the time stamp indicates a pixel of the image.

Furthermore, the decision makers of the decision tree may each be configured to select from each of two or more of detection signal pulses the one which has been received earliest and to apply the respective earliest detection signal pulses on a decision maker output. Particularly, the decision makers of the decision tree may be configured to select from each of the two of detection signal pulses the one which has been received earlier and to apply the respective earlier detection signal pulses on a decision maker output.

The above imaging sensor device may include an array of photodiodes sharing a single time-to-digital converter. The array of the photodiodes is configured to receive a light pulse reflected on an object the distance or presence of which shall be measured so that the received light signal pulses arrive at the photodiodes simultaneously or subsequently. The detector units are each associated to the photodiodes to detect the light signal pulses and to provide detections signal pulses corresponding thereto. By means of a decision-making in the pulse selection unit, one of the so obtained detection signal pulses is selected by way of a first-come win-all policy.

One idea of the above image sensor device is that the pulse selection unit provides a configuration which has a reduced skew, and which does not affect the overall performance of the image sensor device as for all detection signal pulsed the same propagation delay is applied.

Unlike previous approaches where the time-to-digital converter was activated by photon arrival, the above approach allows to continuously run the time-to-digital converter, thus avoiding dead time zones and intensity-dependent power dissipation. This allows to provide a virtually calibration-free system.

Particularly, the decision maker outputs of two decision makers of one stage may be coupled with inputs of a further decision maker of a next stage.

Moreover, each of the decision makers may be configured to provide an address information indicating which of the detection signal pulses is the earlier detection signal pulse.

Particularly, an address determining unit may be configured to generate an address write signal indicating the one detector unit which has provided the earliest detection signal pulse depending on the address information of each of the decision makers.

According to an embodiment the decision maker includes two coupled flipflops each of which is configured to be triggered by one of two detection signal pulses and to block the respective other of the flipflops being triggered by the other of the two detection signal pulses, wherein the output of the triggered flipflop is applied on the decision maker output.

Moreover, the outputs of the flipflops may be stored in a latch, particularly in an SR-latch, which provides the address information indicating which of the two detection signal pulses has been the earlier detection signal pulse.

It may be provided that an array of photodiodes is arranged in an array so that a single light signal pulse reflected on an object is capable of interacting with a plurality of the photodiodes of the array.

Particularly, the photodiodes include a single-photon avalanche diode.

Furthermore, the detector units may each be associated to one of a plurality of single-photon avalanche diodes of the array, wherein each detector unit is configured to quench the associated single-photon avalanche diode after receipt of a light signal pulse.

BRIEF DESCRIPTION OF THE DRAWINGS

Examples are described in more detail in conjunction with the accompanying drawings, in which.

DESCRIPTION

In the following the configuration of a direct time-of-flight (DTOF) 3D single-photon avalanche diode (SPAD) based 3D imaging sensor device as an example of the photon detecting 3D imaging sensor device is described in detail.

Figure 1:
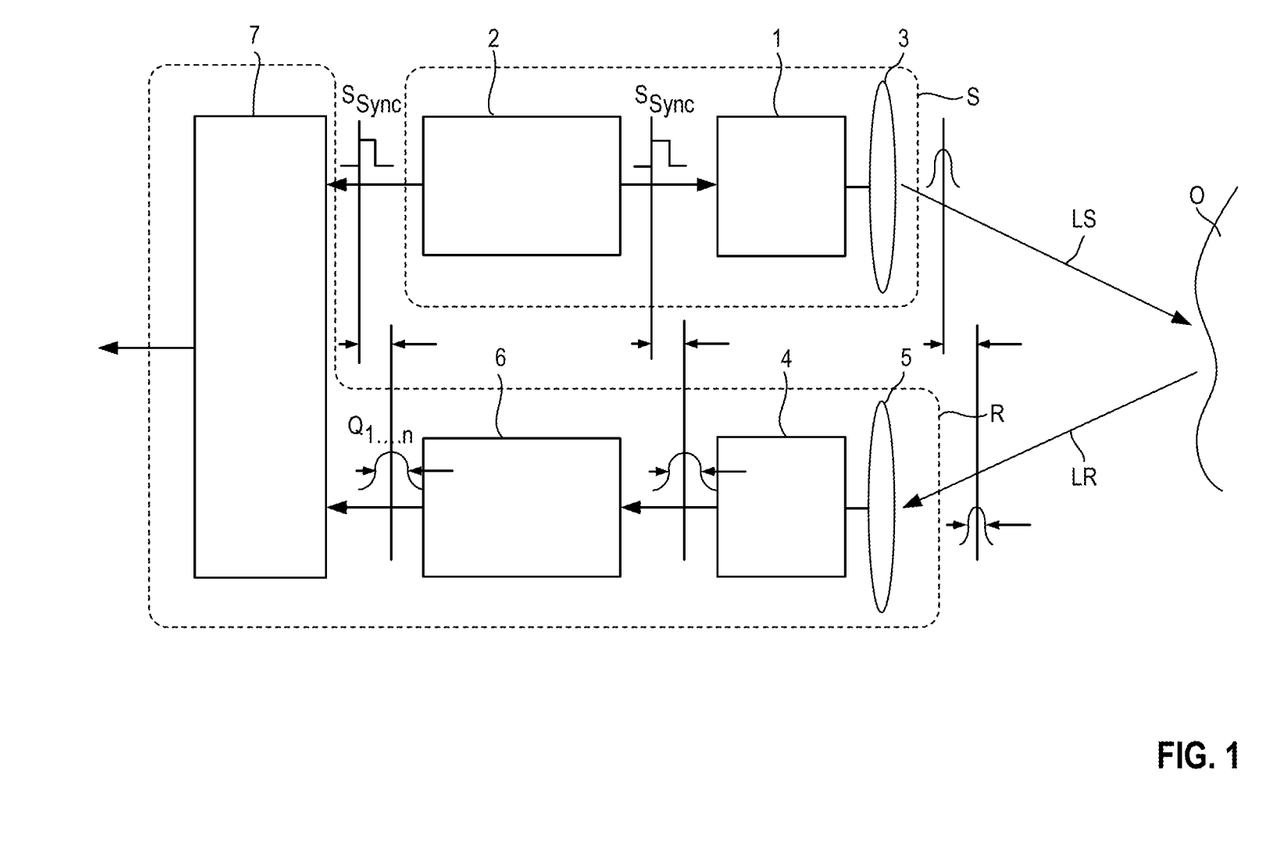
FIG. 1 shows a general configuration of a photon detecting 3D imaging sensor device.

FIG. 1 depicts the basic concept of a DTOF imaging sensor device according to the present invention. On a sending side S, a diode laser 1 is controlled by a synchronization signal $S_{sync}$ provided by a pulse generator 2 so that a pulsed laser signal LS is directed onto an object O through one or more optical elements 3, such as a beam collimator or the like. The pulsed laser signal is reflected by the object O onto a receiver side R.

The receiver side R is formed by a photodiode array 4 onto which the reflected pulsed laser light LR is collected by a receiver optics 5 and detected by one or more of the photodiodes. The photodiodes may be formed by single-photon detecting diodes, such as SPADs. The signals from the photodiodes are received by means of a single quenching detector of a quenching detector array 6.

By the quenching detectors pulses of a respective detection signal $Q_{1...n}$ can be obtained based on the arrival time of a laser pulse of the reflected pulsed laser signal LR which has been received in the associated photodiode. So, depending on the number of photodiodes in the photodiode array 4 the number of detection signals $Q_{1...n}$ is obtained.

The travel time of the pulsed laser signal to the object O and back to the photodiode array 4 depends on the distance of the object O. Therefore, the travel time of the pulsed laser signal corresponds to the distance of the portion of the object to be measured wherein the laser signal pulse has been detected and so provides a distance information to the pixel which is associated to the respective portion of the object.

The travel time can be determined by a time-to-digital converter 7 measuring a time difference between a pulse of the synchronization signal $S_{sync}$ and a corresponding pulse of the detection signals $Q_{1...n}$. Each of the differences is indicative for a scanned pixel received by the photodiode array 4. However, as a single pulse of the pulsed laser signal sent out by the diode laser 1 will likely trigger several photodiodes of the photodiode array 4 so that several detection signal pulses will be generated. A common approach to cope with these detection signal pulses is to apply a first-come-win-all strategy in a pulse selection unit, so that only the quickest detection signal pulse is considered. After one detection, the pulse selection unit is reset or self-resets, being available for a new detection.

Figure 2:
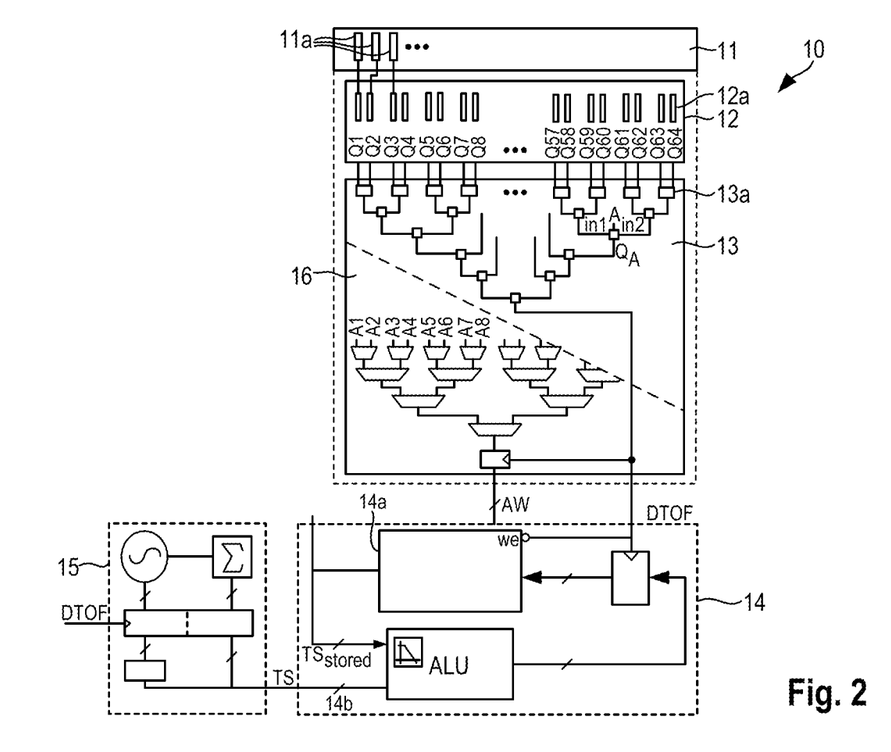
FIG. 2 shows a configuration of a SPAD-based 3D imaging sensor device as an embodiment of the present invention.

In FIG. 2 a configuration of a 3D SPAD-based 3D image sensor device 10 is shown in more detail. A SPAD array 11 having a number n of single photon avalanche diodes (SPADs) 11a is coupled with a quenching detector array 12 with quenching detector units 12a each associated to one of the SPADs 11a to detect single photon events and to provide a corresponding detection signal pulse $Q_{1...n}$ when one or more photons or a light signal pulse is received in the associated SPAD 11a.

Figure 3:
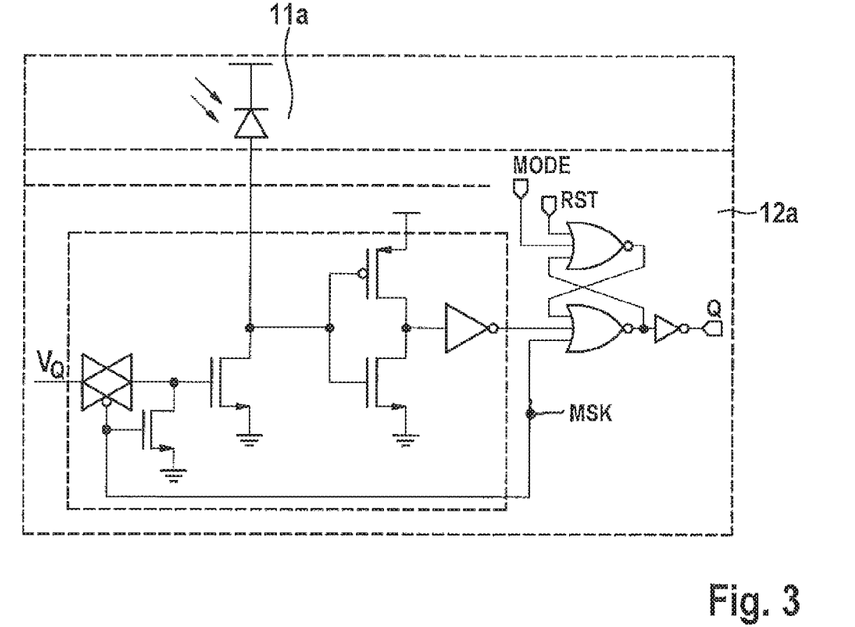
FIG. 3 shows a schematic of a quenching detector.

Each of the quenching detector units 12a of the quenching detector array 12 can be formed as shown in FIG. 3. The quenching detector unit 12a of FIG. 3 is shows as a passive quenching detector, however, other types of quenching detector units are applicable as well. The quenching detector unit 12a is configured to provide a MOSFET in series with the SPAD to allow passive quenching when an avalanche current flows. After a signal has been detected by a respective quenching detector unit 12a, the associated SPAD 11a is reset to allow reception of a next signal. Each SPAD 11a can be individually masked by a control signal MSK.

The outputs of the quenching detector array 12 proving pulses of the detection signals $Q_{1...n}$ are coupled with a pulse selection unit 13. The pulse selection unit 13 is configured to provide a timing signal DTOF corresponding to one of the quenching detector outputs. The signal is selected by the first-come-win-all policy so that the pulse of the detection signals $Q_{1...n}$ which first arrives at the inputs of the pulse selection unit 13 is selected and propagated through to the output of the pulse selection unit 13. In other words, the first (earliest) leading edge of all detection signal $Q_{1 \ldots n}$ pulses applied to the pulse selection unit 13, is propagated through the pulse selection unit 13 to its output.

Furthermore, the pulse selection unit 13 allows to provide an address of the SPAD 11a in the SPAD array 11 or the quenching detector unit 12a of the quenching detector array 12, respectively, which has been selected for supplying its signal to the output of the pulse selection unit 13.

The pulse selection unit 13 is formed by a tree-like structure of dual-input decision makers 13a each of which receives two detection signal Q pulses from a pair of detector units at its inputs in1, in2 and propagates to its decision maker output QA a selected one of the pair of detections signals Q the pulse of which has been received earlier, i.e. before the other detection signal pulse arrives. By cascading the decision makers 13a to a tree-like structure, i.e. coupling each two outputs of two decision makers 13a of a previous stage to inputs of a decision maker 13a of a next (subsequent) stage the earliest detection signal pulse from the number of detection signal pulses can be propagated to the output of the pulse selection unit 13 as the timing signal DTOF. In practice, the leading edge of the earliest detection signal pulse will lead to a corresponding edge of the timing signal DTOF. In general, decision makers 13a for the pulse selection unit 13 can have any number of inputs for receiving pulse detection signals. In digital systems, however, it's preferred to use decision makers with two inputs and cascade them in stages.

Furthermore, each of the decision makers 13a provides an address information A indicating which detecting signal Q at its inputs in1, in2 has been propagated to the decision maker output QA. From the address information A of each decision maker 13a an address write signal AW is generated to indicate the pixel address into which the resulting timing information is written.

Figure 4:
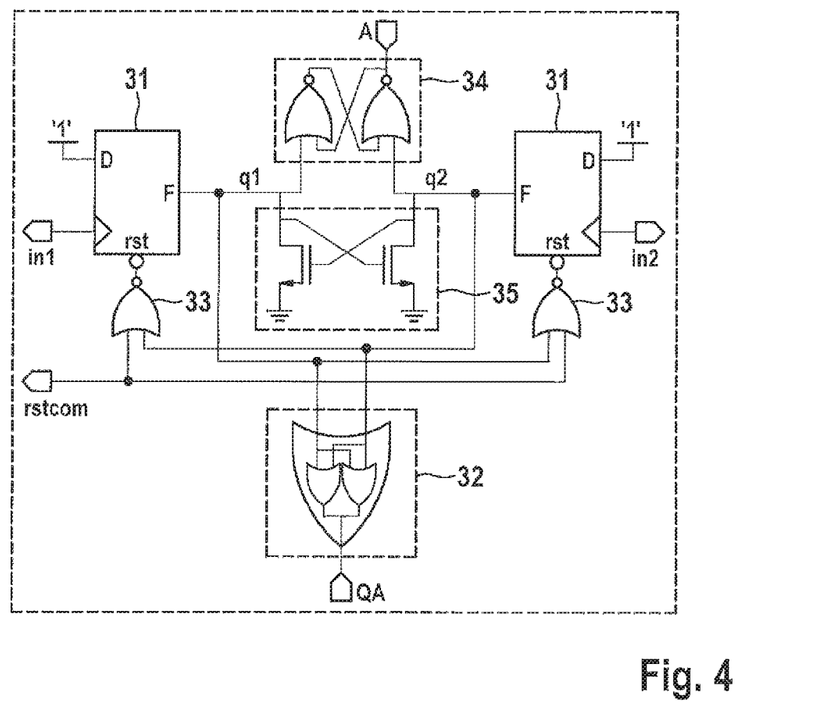
FIG. 4 shows a schematic of a decision maker.

In FIG. 4, an embodiment of the decision maker 13a is illustrated in more detail. The decision maker 13a has two flip-flops 31, particularly D-type flip-flops, each having a reset input rst. Upon arrival of concurrent digital inputs in1, in2 as detection signals Q of the quenching detector units 12a at a respective clock terminal of the flip-flop 31, a fixed state "1" is sampled from a D-input of the flip-flop 31. The outputs F of the flip-flops 31 are respectively coupled with the reset input rst of their counterpart flip-flop 31, thus blocking it from subsequent detection. So, the flip-flop 31 which receives the first (earlier) pulse of the incoming detections signals blocks the other flip-flop 31 from detecting a further pulse (latter pulse).

Although the D-type flip-flop 31 has no metastability at the clock inputs, there might exist a metastability between establishing the output and/or being reset within the flip-flops 31 when the D-type flip-flops 31 switch simultaneously. To cope with this issue, flip-flop outputs are mitigated by an NMOS latch 35 which reaches an overall metastability of a time period of a few picoseconds. The NMOS latch 35 is formed as a high-gain and fast cell, so that a slightest time difference between the flip-flop outputs is enough to create a low impedance on the late flip-flop output (to zero), giving it time to be reset by the earlier switching flip-flop 31. This helps to substantially reduce the time windows when a metastability may occur.

The coupling to the reset inputs rst is made via a respective OR-gate 33 so that a common reset signal rstcom can also be applied to reset both D-type flip-flops 31 simultaneously before the beginning of a selection making. In other words, after each detection, the decision tree can be reset and made available to the next event.

By means of an output OR-gate 32 the resulting leading edge of the detection signal pulse at one of the flip-flops 31 outputs is propagated to the decision maker output as signal QA. Upon the event, the signal propagates from decision maker 13a to decision maker 13a, until it reaches the end of the decision tree. At that point, there is a delay element that generates the common reset signal rstcom for the whole decision tree, resetting all flip-flops 31 and bringing them into a state where they can receive the next event.

An SR-latch 34 is provided which is coupled with the outputs of the flip-flops 31 to store an address information A about which of the flip-flops 31 has been triggered first (by the earlier pulse of the concurring detections signals Q).

The address information A of all the decision makers 13a is processed by an address generation unit 16 to output an address write signal AW. The address write signal AW is able to acquire the address, of each SPAD 11a individually, so as to make the granularity of the sensor as 1 and each pixel can be mapped to an image. The address write signal AW indicates the SPAD 11a and respectively the quenching detector unit 12a which is the origin of the pulse detection signal Q propagated as the timing signal DTOF. The address generation unit 16 is formed with one or more multiplexer trees each having a number of tree-like cascaded 2:1 multiplexers 16a and outputting one bit of the address write signal AW.

The most significant bit of the address write signal AW corresponds to the address information A of the decision maker of the last stage. Each further stage of the decision makers 13a will be processed to obtain a further bit of the address write signal AW beginning with the first stage for the least significant bit of the address write signal AW. The tree structure is that the address information of the relevant stage of the decision makers 13a are applied to inputs of multiplexers of the multiplexer tree which are controlled (by applying on its control input) by the address information A generated by the decision maker 13a of a subsequent stage of the pulse selection unit 13. The outputs of the multiplexers are coupled to inputs of multiplexers of a subsequent stage respectively controlled by the address information A generated by the decision maker 13a of a stage subsequent thereto. The tree narrows until only one multiplexer is left which is controlled by the address information A of the decision maker 13a of the last stage.

Figure 5:
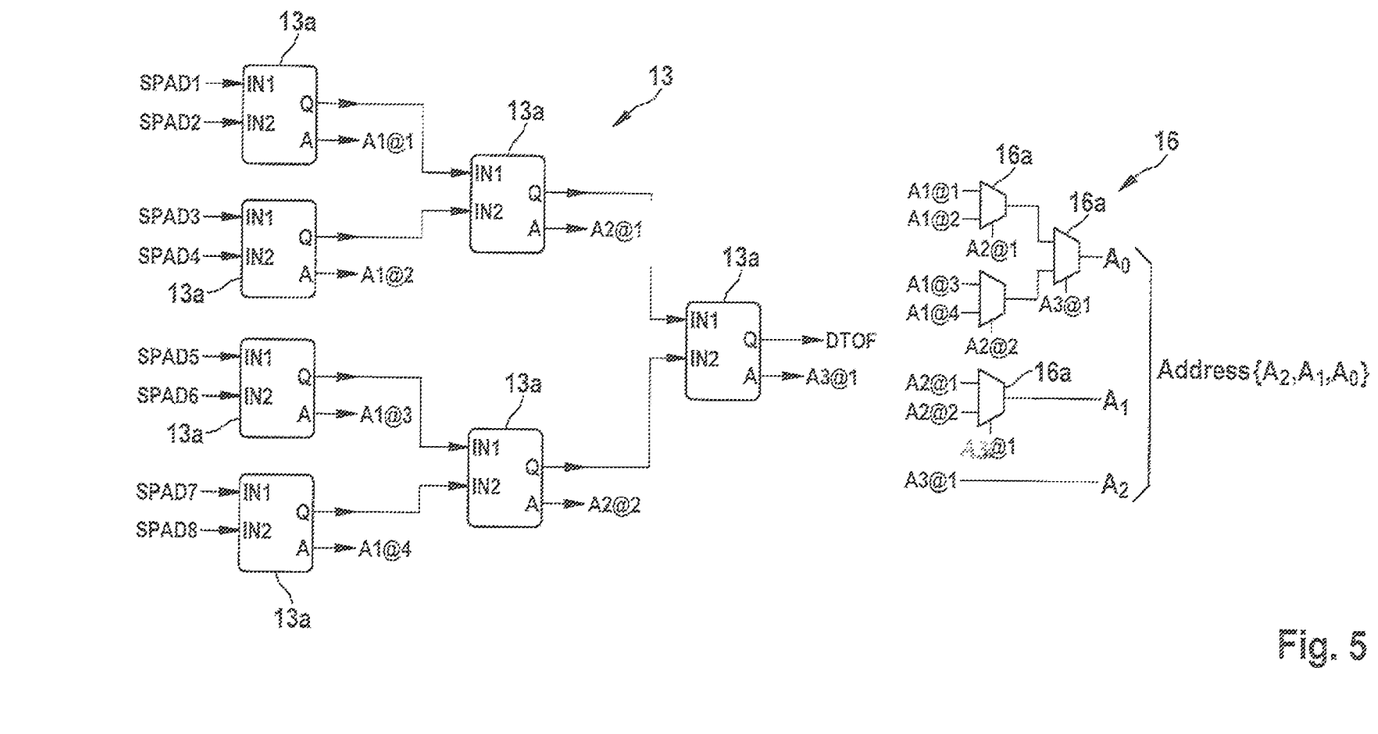
FIG. 5 shows an example of the proposed architecture, with 8 inputs and one output.

In FIG. 5, function of an address generation unit 16 is shown in more detail for an example of 8 outputs of quenching detector units 12a being processed by a pulse selection unit 13 with 8 inputs. The pulse selection unit 13 has 4 decision makers 13a of a first stage, 2 decision makers 13a of a second stage and one decision maker 13a of a third stage. As shown of the left drawing of FIG. 5, each of the decision makers 13a generates a decision maker output QA and an address information A which is indexed as A"X"@"Y" with X referencing the number of the stage ("1": first stage, "2": second stage and "3": third stage) and "Y" referencing the number (index) of the decision maker 13a in a respective stage.

On the right side of FIG. 5, the multiplexer tree 16 is shown for the given example. For generation of the least significant bit of the address write signal AW, each of the multiplexers 16a of the first stage A receives the address information of the first stage of decision makers 13a of the pulse selection unit 13 while on the control inputs the multiplexers 16a of the first stage it is applied the address information of the second stage of decision makers 13a. The outputs of the multiplexers 16a of the first stage are applied on inputs of the multiplexer 16a of the second stage of the multiplexer tree whose control input is coupled with the address information A of the decision maker 13a of the third stage of the pulse selection unit 13. This concept is continued. For generation of the next significant bit of the address write signal AW, a multiplexers 16a receives the address information of the second stage of decision makers 13a of the pulse selection unit 13 while on the control input of the multiplexer 16a it is applied the address information of the decision maker 13a of the third stage. The most significant bit of the address write signal AW corresponds to the output of the decision maker 13a of the last stage of the pulse selection unit 13.

The detection signals Q can be exemplarily combined in a pulse selection unit 13 with a six-level decision tree for a 64:1 pulse selection unit 13 to generate the final timing signal DTOF whereas the address signal outputs A are used to generate a 6-bit address write signal AW identifying the respective SPAD 11a or quenching detector unit 12a which has generated the propagated pulse as the timing signal DTOF.

The timing signal DTOF is applied to a shared time-to-digital-converter 15 which generates a time stamp TS to be applied to a processing unit 14. The time-to-digital converter 15 is well known in the art and may exemplarily comprise a current-starved 8-stage pseudo-differential ring oscillator connected to a ripple counter to form a time-to-digital converter with a low resolution of a few picoseconds. The time-to-digital converter 15 is configured to permanently provide a counter value which can be retrieved as a time stamp when triggered by the timing signal DTOF. The time stamp corresponds to the time of flight of the light signal pulse onto the respective photodiode/SPAD and therefor can be interpreted as an indication of a distance for the pixel of the detected image.

The time-to-digital converter 15 may comprise a ring oscillator and a counter and is synchronized to the synchronization signal $S_{sync}$, which defines the range of measurements, i.e. the beginning of the time period to be measured. One count in the counter, corresponds to a full period of the oscillator. The time-to-digital converter 15 provides an information including the counter value and a phase information of the oscillator to form a time-to-digital converter 15 output. The natural overflow of the time-to-digital converter 15 is used, so the laser pulse is always located at the same counter value of the time-to-digital converter 15.

The processing unit 14 combines (by adding) the time stamp TS with a time stamp $TS_{stored}$ stored in a memory unit 14a at a memory address given by the address write signal AW, and the result is stored at the same address at the next timing signal DTOF.

The above architecture provides for an improved imaging sensor device and enables high uniformity and low dead time between the photon detections. Particularly, the decision tree of the pulse selection unit is efficient as it adds little delay of the detection signals while the delay is uniform for detection signals of each of the quenching detector units.

What is claimed is:

1. A photon detecting 3D imaging sensor device for detecting distance information for pixels in an image, comprising:
   an array of detector units, wherein each of the detector units is configured to receive a respective light signal pulse and to provide a respective detection signal pulse on receipt of the respective light signal pulse;
   a pulse selection unit including a decision tree with a plurality of stages, wherein each of at least a subset of the plurality of stages has a plurality of decision makers which are cascaded to propagate an earliest detection signal pulse of a respective one of the detector units as a timing signal;
   a time-to-digital converter configured to receive the timing signal and to provide a time stamp depending on the timing signal wherein the time stamp indicates a distance information for a respective one of the pixels in the image;
   an address determining unit; wherein:
   each of the plurality of decision makers is configured to provide an address information indicating which of the detection signal pulses is the respective earliest detection signal pulse;
   the address determining unit is configured to generate an address write signal indicating the one detector unit which has provided the earliest detection signal pulse depending on the respective address information of each of the decision makers; and
   the address determining unit has one or more multiplexer trees each for generation of a respective bit of the address write signal, wherein each of the multiplexer trees is configured so that each multiplexer in the respective multiplex tree receives at its inputs address information of decision makers of one of the stages of the pulse selection unit or outputs of multiplexers of a preceding stage of the respective multiplexer tree and at its control input the address information of one of the decision makers of a subsequent one of the stages of the pulse selection unit.

2. The 3D imaging sensor device according to claim 1, wherein the decision makers of the decision tree are each configured to select from each of two or more of the detection signal pulses the one of the two or more of the detection signal pulses which has been received earliest and to apply the respective earliest detection signal pulses on a decision maker output.

3. The 3D imaging sensor device according to claim 2, wherein the decision maker outputs of two of the decision makers of one of the stages are coupled with inputs of a further one of the decision makers of a next one of the stages.

4. The 3D imaging sensor device according to claim 1, wherein at least one of the decision makers includes two coupled flipflops each of which is configured to be triggered by one of the detection signal pulses and to block the respective other of the flipflops being triggered by the other of the detection signal pulses, wherein an output of the triggered flipflop is applied on the decision maker output.

5. The 3D imaging sensor device according to claim 4, wherein the outputs of the respective flipflops are stored in a latch which provides an address information indicating which of the detection signal pulses has been the earliest detection signal pulse.

6. The 3D imaging sensor device according to claim 1, wherein photodiodes are arranged in an array of photodiodes so that a single light signal pulse reflected on an object is capable of interacting with a plurality of the photodiodes of the array of photodiodes.

7. The 3D imaging sensor device according to claim 6, wherein the photodiodes include one or more single-photon avalanche diodes.

8. The 3D imaging sensor device according to claim 7, wherein the detector units are each associated to one of a plurality of single-photon avalanche diodes of the array of photodiodes, wherein each detector unit is configured to quench the associated single-photon avalanche diode after receipt of a light signal pulse.

9. The 3D imaging sensor device according to claim 1, wherein the time-to-digital converter is configured to continuously run, wherein the time stamp indicates a counter value depending on the timing signal.

* * * * *